(12) United States Patent
Hashimoto

(10) Patent No.: US 8,504,743 B2
(45) Date of Patent: Aug. 6, 2013

(54) INFORMATION PROCESSING SYSTEM AND DATA TRANSFER METHOD

(75) Inventor: Akinori Hashimoto, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 0 days.

(21) Appl. No.: 12/782,185

(22) Filed: May 18, 2010

(65) Prior Publication Data

US 2010/0306423 A1 Dec. 2, 2010

(30) Foreign Application Priority Data

May 26, 2009 (JP) ................................. 2009-126784

(51) Int. Cl.
*G06F 3/00* (2006.01)
*G06F 13/28* (2006.01)
*G06F 13/00* (2006.01)
*G06F 5/00* (2006.01)

(52) U.S. Cl.
USPC ........ 710/33; 710/1; 710/20; 710/22; 710/52; 710/100; 710/341

(58) Field of Classification Search
USPC .................................. 710/1–33, 52, 100, 341
See application file for complete search history.

(56) References Cited

U.S. PATENT DOCUMENTS

| | | | | |
|---|---|---|---|---|
| 4,028,680 A | * | 6/1977 | Vittorelli | 715/202 |
| 5,363,488 A | * | 11/1994 | Hidaka et al. | 710/5 |
| 6,341,335 B1 | | 1/2002 | Kanai et al. | |
| 7,404,050 B2 | * | 7/2008 | Gregorius | 711/154 |
| 7,962,669 B2 | * | 6/2011 | Miwa | 710/35 |
| 2002/0138225 A1 | * | 9/2002 | Wong et al. | 702/119 |
| 2004/0260957 A1 | * | 12/2004 | Jeddeloh et al. | 713/300 |
| 2007/0101089 A1 | * | 5/2007 | Worrell | 711/169 |
| 2007/0250659 A1 | * | 10/2007 | Booth et al. | 711/103 |
| 2010/0318691 A1 | * | 12/2010 | Kitagawa | 710/35 |

FOREIGN PATENT DOCUMENTS

| | | |
|---|---|---|
| JP | 4-52741 | 2/1992 |
| JP | 5-165705 | 7/1993 |
| JP | 11-232171 | 8/1999 |

OTHER PUBLICATIONS

Office Action issued by the Japanese Patent Office on May 28, 2013 in the corresponding Japanese patent application No. 2009-126784.

* cited by examiner

*Primary Examiner* — Idriss N Alrobaye
*Assistant Examiner* — Getente A Yimer
(74) *Attorney, Agent, or Firm* — Staas & Halsey LLP

(57) ABSTRACT

An information processing system includes a master module for outputting a transfer state signal in correspondence to a data read instruction when the data read instruction is successively output plural times, the transfer state signal indicating that at least one data read instruction succeeds some one of the data read instructions; and a memory controller for, when receiving the some one of the data read instructions and the corresponding transfer state signal from the master module, supplying data corresponding to the some one of the data read instructions to the master module, while reading data corresponding to the at least one data read instruction, which succeeds the some one of the data read instructions, from a memory and holding the read data in accordance with the received transfer state signal.

6 Claims, 11 Drawing Sheets

INFORMATION PROCESSING SYSTEM AND DATA TRANSFER METHOD

CROSS-REFERENCE TO RELATED APPLICATIONS

This application is based upon and claims the benefit of priority from the prior Japanese Patent Application No. 2009-126784 filed on May 26, 2009, the entire contents of which are incorporated herein by reference.

BACKGROUND

1. Field

The present invention generally relates to a data transfer system, and more particularly to a burst transfer system for transferring a plurality of data in succession.

2. Description of the Related Art

A system LSI (Large Scale Integration) includes function modules depending on the use of the system in addition to a CPU for controlling the entire LSI and a memory controller for accessing a memory which is provided externally of the LSI. For example, an LSI for image processing and data processing includes, as the function modules, a graphic processor for the image processing, a DSP (Digital Signal Processor) for the data processing, a DMAC (Direct Memory Access Controller) for data transfer between memories, etc. Each of those units operates as a master module that requests access to a bus and then executes the access. When one master module issues a data transfer request to an external memory, the memory controller controls a command for the memory, which is disposed externally of the chip (LSI), in response to the data transfer instruction (request). When plural master modules issue data transfer requests at the same time, an arbitration circuit operates to ensure a band necessary for the instruction for which data processing requires to be executed with higher priority. In such a system LSI, the processing performance greatly depends on the transfer processing speed of the memory controller.

A data transfer instruction via an on-chip bus (internal bus) of the system LSI is executed in accordance with a particular interface protocol. As common interface protocols, AMBA provided by ARM Ltd. is widely used and OCP proposed by OCP-IP (Open Core Protocol International Partnership) is also widely known.

In the common interface protocol, a maximum transfer length in one burst transfer is limited. The maximum transfer length is, e.g., 16 in AXI (Advanced eXtensible Interface) and AHB (Advanced High-Performance Bus) of AMBA. Therefore, when the master module tries to execute transfer of data in a comparatively large amount, it executes the burst transfer in the maximum transfer length plural times.

Let here suppose the case that a CPU serving as the master module issues a read request to an external memory. It is also assumed, for example, that the burst length of the memory is set to 4. First, the CPU designates an address A00 and issues a burst transfer instruction with the transfer length of 4. Responsively, a memory controller designates the address A00 to the external memory and issues a read command. After several cycles corresponding to the CAS latency have lapsed from the issuance of the read command, four data are successively read starting from the address A00 of the memory and are received by the memory controller. The memory controller supplies the received four read data to the CPU through an internal bus. A delay from the issuance of the burst transfer instruction by the CPU to the reception of the first data by the CPU is called "initial access latency". The initial access latency depends on the CAS latency of the external memory, a wiring delay on a board through connection between the LSI and the external memory, a delay between the CPU and the memory controller inside the LSI, etc.

When the amount of data as a target of the data transfer is larger than 4, the CPU continuously issues the data transfer instruction. More specifically, the CPU designates a subsequent address A04 and issues another burst transfer instruction with the transfer length of 4. Responsively, the memory controller designates the address A04 to the external memory and issues another read command. After several cycles corresponding to the CAS latency have lapsed from the issuance of the read command, four data are successively read starting from the address A04 of the memory and are received by the memory controller. The memory controller supplies the received four read data to the CPU through the internal bus. Subsequently, the burst read of four data is repeated in a similar manner until the transfer of data in the required amount is completed.

When data is transferred in the required data amount by executing the burst transfer plural times as described above, a waiting time occurs in number of cycles corresponding to the initial access latency whenever the burst transfer is executed. In a system for which high-speed data transfer processing is required, it is not preferable that the initial access latency occurs for each burst transfer.

Japanese Laid-open Patent Publication No. 11-232171 describes a method of calculating an address designated in a data transfer instruction, issued from a master module, within a memory controller and pre-fetching memory data in order to suppress reduction of the data processing capability, which would be caused by the initial access latency. With the disclosed method, however, wasteful memory access is generated for the reason that, because the memory data is always pre-fetched, the previously pre-fetched data have to be discarded at the end of the data transfer.

SUMMARY

According to an aspect of the embodiment, an information processing system includes a master module for outputting a transfer state signal in correspondence to a data read instruction when the data read instruction is successively output plural times, the transfer state signal indicating that at least one data read instruction succeeds some one of the data read instructions; and a memory controller for, when receiving the some one of the data read instructions and the corresponding transfer state signal from the master module, supplying data corresponding to the some one of the data read instructions to the master module, while reading data corresponding to the at least one data read instruction, which succeeds the some one of the data read instructions, from a memory and holding the read data in accordance with the received transfer state signal.

The object and advantages of the various embodiments will be realized and attained by means of the elements and combinations particularly pointed out in the claims.

It is to be understood that both the foregoing general description and the following detailed description are exemplary and explanatory and are not restrictive of the various embodiments, as claimed.

The above-described embodiments are intended as examples, and all embodiments of the present invention are not limited to including the features described above.

DESCRIPTION OF EMBODIMENTS

Embodiments of the present invention will be described in detail below with reference to the accompanying drawings.

Figure 1:
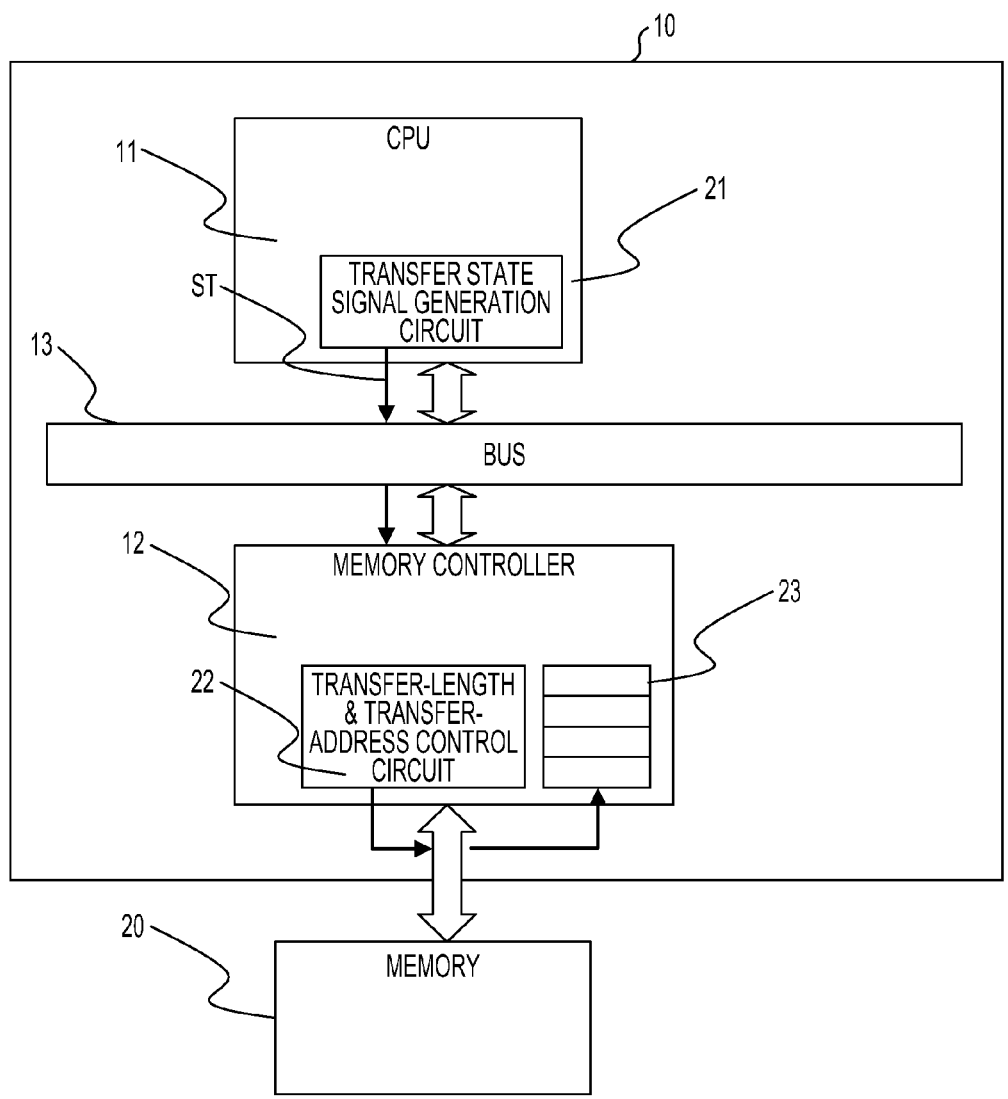
FIG. 1 is a block diagram illustrating one example of configuration of a system including a system LSI and a memory.

FIG. 1 is a block diagram illustrating one example of configuration of a system including a system LSI and a memory. Referring to FIG. 1, a system LSI 10 serving as an information processing system is connected to a memory 20. The system LSI 10 supplies a read instruction or a write instruction and an access address to the memory 20 and then executes a read operation or a write operation with respect to the designated address. The memory 20 may be, for example, an SDRAM (Synchronous Dynamic Random Access Memory) or a memory capable of successively reading data and executing burst transfer. In the case of an SDRAM, for example, a burst length of the memory 20 may be set to the desired length in advance by using a mode register setting command.

The system LSI 10 includes a CPU 11 that functions as a master module, a memory controller 12 for controlling access to the memory 20, and a bus circuit 13 for connecting the CPU 11 and the memory controller 12 to each other. A data transfer instruction via the bus circuit 13 is executed in accordance with an interface protocol, such as AMBA provided by ARM Ltd. While the embodiment is described in connection with the case of using the CPU as an example of the master module, the master module is not limited to the CPU.

The CPU 11 includes a transfer state signal generation circuit 21. When the CPU 11 successively issues a burst transfer instruction plural times, the transfer state signal generation circuit 21 outputs a transfer state signal ST in correspondence to the burst transfer instruction. The transfer state signal ST may be a signal indicating that at least one data transfer instruction succeeds some one of the data transfer instructions. In the example illustrated in FIG. 1, the transfer state signal ST may have a first signal state (e.g., a value "1") indicating, for the data transfer instruction which is not the last one of the plural burst transfers, that one data transfer instruction succeeds. Also, the transfer state signal ST may have a second signal state (e.g., a value "0") indicating, for the last one of the plural burst transfers, that a number zero (0) of data transfer instruction succeeds (namely, there is no succeeding data transfer instruction). The generated transfer state signal ST is supplied to the memory controller 12 via the bus circuit 13 together with a control signal according to an I/F protocol (interface protocol) for the data transfer.

The memory controller 12 includes a transfer-length & transfer-address control circuit 22 and a pre-fetched data storage buffer 23. When the memory controller 12 receives one data transfer instruction and the corresponding transfer state signal ST, the memory controller 12 pre-fetches, from the memory 20, data corresponding to at least one data transfer instruction, which succeeds the received data transfer instruction, depending on the transfer state signal ST. The pre-fetched data is loaded and held in the pre-fetched data storage buffer 23. Further, the transfer-length & transfer-address control circuit 22 is used to access data corresponding to the data transfer instruction, which succeeds the received data transfer instruction.

In the example of FIG. 1, the transfer state signal ST takes a value "1" or "0". When the transfer state signal ST in the first signal state (e.g., a value "1") is received, the memory controller 12 recognizes that the data transfer instruction received together with the transfer state signal ST is not the last data transfer instruction and at least one succeeding data transfer instruction is present. In that case, the memory controller 12 reads, from the memory 20, data corresponding to one data transfer instruction following the received data transfer instruction which is not the last one. The read data is loaded and held in the pre-fetched data storage buffer 23. Also, when the transfer state signal ST in the second signal state (e.g., a value "0") is received, the memory controller 12 recognizes that the data transfer instruction received together with the transfer state signal ST is the last data transfer instruction and there is no succeeding data transfer instruction. In that case, the memory controller 12 does not execute the operation of newly reading data from the memory 20. Accordingly, wasteful memory access is not generated.

Further, the memory controller 12 supplies the data corresponding to the received data transfer instruction to the CPU 11. If the data corresponding to the received data transfer instruction is already read from the memory 20 and loaded in the pre-fetched data storage buffer 23, the loaded data may be supplied to the CPU 11. When the received data transfer instruction is the first data transfer instruction, corresponding data is not yet loaded in the pre-fetched data storage buffer 23. Therefore, the memory controller 12 may read the data corresponding to the first data transfer instruction from the memory 20 and directly supply the read data to the CPU 11.

Figure 2:
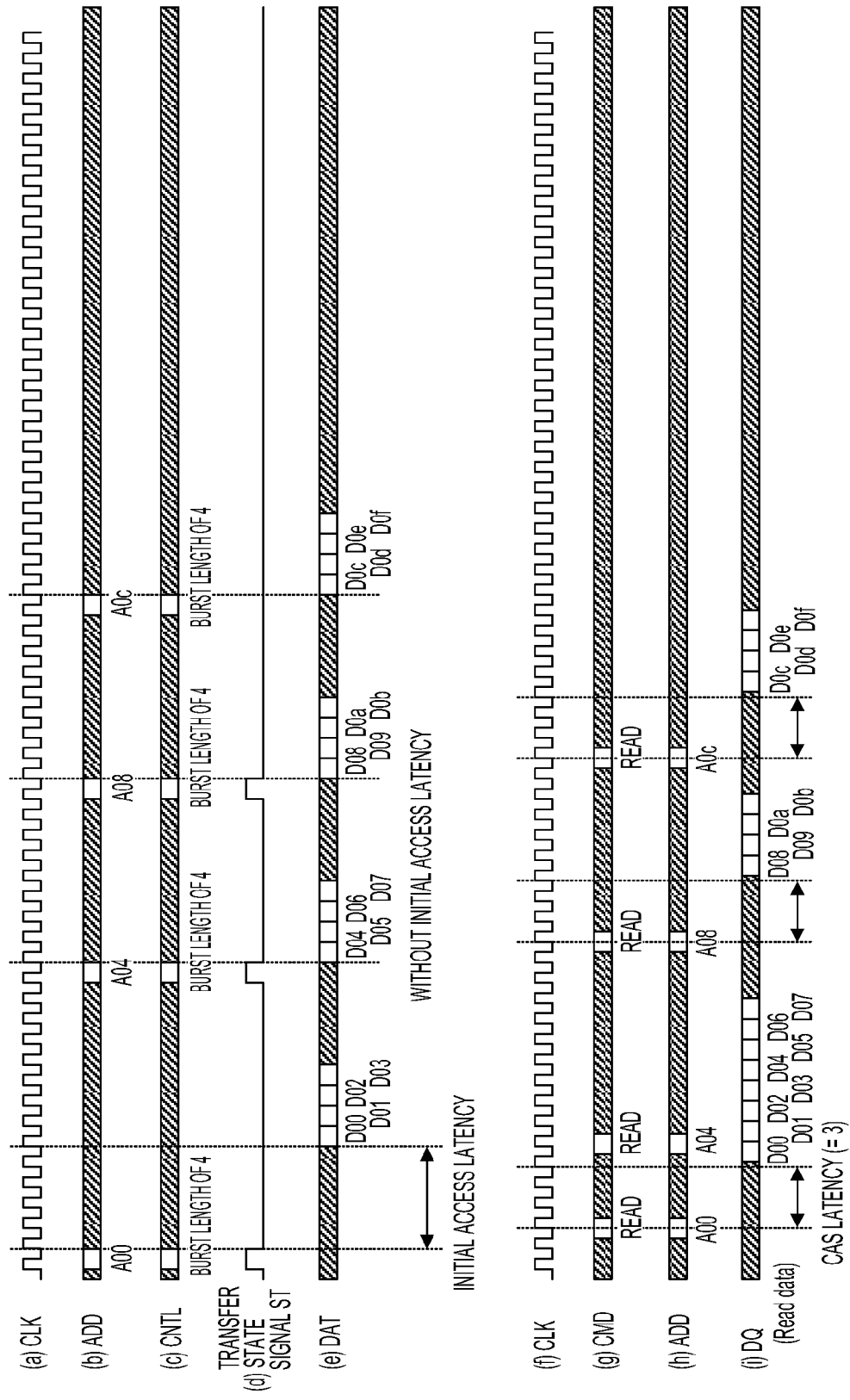
FIG. 2 illustrates one example of operations of a CPU and a memory controller.

FIG. 2 illustrates one example of operations of the CPU 11 and the memory controller 12. Data transfer between the CPU 11 and the memory controller 12 and data transfer between the memory controller 12 and the memory 20 are executed in sync with a clock signal CLK illustrated at (a) and (f) in FIG. 2. The same clock signal CLK is illustrated at two positions, i.e., at (a) and (f), for easier understanding of various signals in FIG. 2. The CPU 11 designates an access address by using an address signal ADD illustrated at (b) and requests data transfer by using a control signal CNTL illustrated at (c). Further, the CPU 11 transmits a transfer state signal ST, illustrated at (d), in correspondence to a data transfer instruction. In FIG. 2, (e) represents data received by the CPU 11 from the memory controller 12. The memory controller 12 designates a read command or a write command by using a command signal CMD illustrated at (g) and also designates an access address by using an address signal ADD illustrated at (h). Further, (i) represents read data DQ received by the memory controller 12 from the memory 20.

First, the CPU 11 issues a burst transfer request having a transfer length of 4 with respect to an address A00. The transfer state signal ST output from the CPU 11 in correspondence to the burst transfer request is set to a value "HIGH" indicating that there is at least one succeeding burst transfer request. While the transfer state signal ST is output in the same length and in the same cycle as the burst transfer request in the example of FIG. 2, the transfer state signal ST and the burst transfer request are not always required to be output at the same timing so long as the transfer state signal ST and the burst transfer request may be made correspondent to each other in one-to-one relation. By receiving the transfer state signal ST in the "HIGH" state, the memory controller 12 may previously recognize that another burst transfer starting from an address 04 will be executed after the burst transfer starting from the address A00, which is instructed by the current transfer request. The fact that the next burst transfer request is made with respect to the address A04 may be recognized through calculation, taking into account that the burst length is 4 and a target address of the current burst transfer request is the address A00.

Because the current burst transfer request with respect to the address A00 is the first burst transfer request, data corresponding to the current burst transfer request with respect to the address A00 is not yet loaded in the pre-fetched data storage buffer 23 of the memory controller 12. Accordingly, the memory controller 12 issues a read instruction READ with designation of the address A00, thereby reading four data D00 to D03 from the memory 20 while the address A00 is set as a first start address. For example, when the size of one data is a width of 32 bits (4 bytes), four data each having the size of 4 bytes are read. Further, the memory controller 12 issues another read instruction READ with designation of the address A04, thereby reading, as pre-fetched data, four data D04 to D07 from the memory 20 while the address A04 is set as a second start address. Because the memory 20 is set corresponding to the burst length of 4, four data are read twice by issuing the read instruction twice. If the burst length may be variably set for each read instruction, eight data D00 to D07 may be read by issuing a read instruction for the burst length of 8 once. For simplification of the drawing, FIG. 2 is illustrated such that a data read operation is executed with the read instruction READ and the address designation. In fact, when the memory 20 is, e.g., an SDRAM, the data read operation is executed by designating a row address together with an active command ACT and further designating a column address together with a read command READ.

The memory controller 12 immediately transfers the data D00 to D03, which correspond to the current burst transfer request with respect to the address A00, to the CPU 11. On that occasion, an initial access latency of 5 cycles is generated as the sum of a CAS latency of 3 cycles generated in the memory 20 and a delay generated in the memory controller 12. Also, the memory controller 12 loads and holds, in the pre-fetched data storage buffer 23, the data D04 to D07 corresponding to the next burst transfer request with respect to the subsequent second start address A04.

After receiving the data D00 to D03 corresponding to the burst transfer request with respect to the first start address A00 and then executing a predetermined internal process, the CPU 11 issues the next burst transfer request with respect to the subsequent second start address A04. The transfer state signal ST output from the CPU 11 in correspondence to the above next burst transfer request is set to the value "HIGH" indicating that there is at least one succeeding burst transfer request. The current burst transfer request with respect to the address A04 is not the first burst transfer request. At this time, data corresponding to the current burst transfer request with respect to the address A04 is already loaded in the pre-fetched data storage buffer 23 of the memory controller 12. Accordingly, the memory controller 12 immediately transfers the data D04 to D07, which correspond to the current burst transfer request with respect to the address A04, to the CPU 11 from the pre-fetched data storage buffer 23. On that occasion, the initial access latency necessary for the CPU 11 to receive the data is not generated. Further, the memory controller 12 issues still another read instruction READ with designation of a subsequent address A08, thereby reading four data D08 to D0$b$ from the memory 20 while the address A08 is set as a third start address. The memory controller 12 loads and holds, in the pre-fetched data storage buffer 23, the data D08 to D0$b$ corresponding to the next burst transfer request with respect to the subsequent third start address A08.

After receiving the data D04 to D07 corresponding to the burst transfer request with respect to the second start address A04 and then executing the predetermined internal process, the CPU 11 issues the next burst transfer request with respect to the subsequent third start address A08. The transfer state signal ST output from the CPU 11 in correspondence to the above next burst transfer request is set to the value "HIGH" indicating that there is at least one succeeding burst transfer request. The current burst transfer request with respect to the address A08 is not the first burst transfer request. At this time, data corresponding to the current burst transfer request with respect to the address A08 is already loaded in the pre-fetched data storage buffer 23 of the memory controller 12. Accordingly, the memory controller 12 immediately transfers the data D08 to D0$b$, which correspond to the current burst transfer request with respect to the address A08, to the CPU 11 from the pre-fetched data storage buffer 23. On that occasion, the initial access latency necessary for the CPU 11 to receive the data is not generated. Further, the memory controller 12 issues still another read instruction READ with designation of a subsequent address A0$c$, thereby reading four data D0$c$ to D0$f$ from the memory 20 while the address A0$c$ is set as the last start address. The memory controller 12 loads and holds, in the pre-fetched data storage buffer 23, the data D0$c$ to D0$f$ corresponding to the next burst transfer request with respect to the subsequent last start address A0$c$.

After receiving the data D08 to D0$b$ corresponding to the burst transfer request with respect to the third start address A04 and then executing the predetermined internal process, the CPU 11 issues the next burst transfer request with respect to the subsequent last start address A0$c$. The transfer state signal ST output from the CPU 11 in correspondence to the above next burst transfer request is set to the value "LOW" indicating that a number zero (0) of data transfer instruction succeeds (namely, there is no succeeding data transfer instruction). The current burst transfer request with respect to the address A0$c$ is not the first burst transfer request. At this time, data corresponding to the current burst transfer request with respect to the address A0$c$ is already loaded in the pre-fetched data storage buffer 23 of the memory controller 12. Accordingly, the memory controller 12 immediately transfers the data D0$c$ to D0$f$, which correspond to the current burst transfer request with respect to the address A0$c$, to the CPU 11 from the pre-fetched data storage buffer 23. On that occasion, the initial access latency necessary for the CPU 11 to receive the data is not generated. Further, the memory controller 12 may previously recognize, from the transfer state signal ST in the "LOW" state, that no more burst transfer will be executed after the burst transfer that is instructed by the current burst transfer request with respect to the address A0$c$. In this case, therefore, the memory controller 12 does not execute the operation of reading data from the memory 20.

Thus, when the CPU 11 executes a series of burst transfers (four burst transfers in the example of FIG. 2) as described above, the initial access latency is generated for the first burst transfer. However, the initial access latency is not generated for the second and subsequent burst transfers. This is because the memory controller 12 may execute the pre-fetch of data by setting the transfer state signal ST so as to indicate the presence of at least one succeeding burst transfer. Further, the memory controller 12 does not execute the pre-fetch of data for the last burst transfer by setting the transfer state signal ST so as to indicate the absence of the succeeding burst transfer. As a result, wasteful memory access may be avoided.

Figure 3:
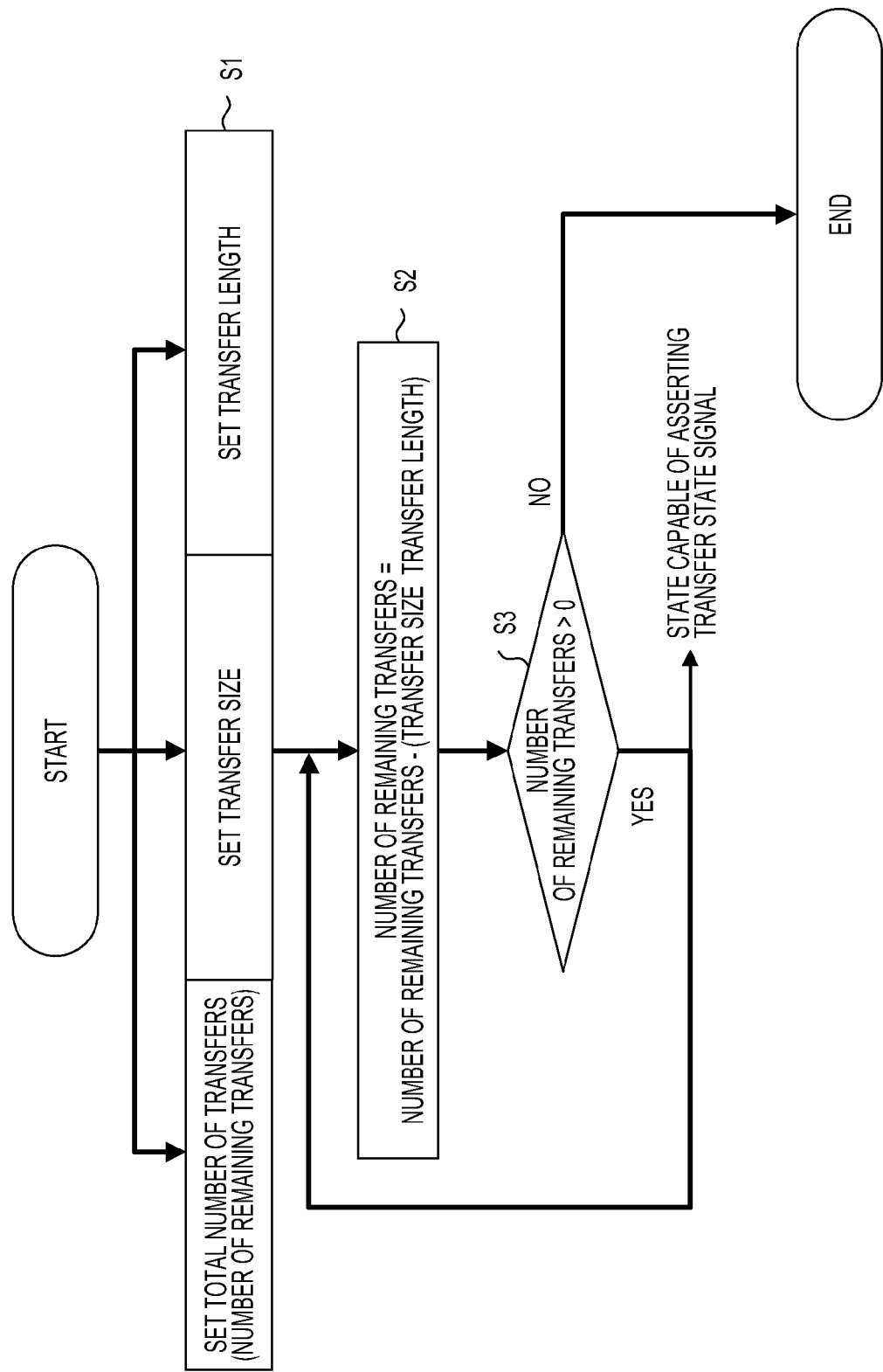
FIG. 3 is a flowchart illustrating a transfer state signal generation process executed on the CPU side.

FIG. 3 is a flowchart illustrating a transfer state signal generation process executed on the CPU 11 side. In step S1, the CPU 11 sets a total number of transfers in a series of burst transfers, a transfer size, and a transfer length. Herein, the total number of transfers means a total amount of data to be transferred by the series of burst transfers. The transfer size means a size of one set of data to be transferred in one cycle. The transfer size is set to a width of, e.g., 32 bits or 8 bits. The transfer length means the number of data to be transferred by one burst (i.e., a burst length). In the example of FIG. 2, the transfer length is 4 (e.g., D0 to D3).

In step S2, the transfer state signal generation circuit 21 in the CPU 11 calculates the number of remaining transfers based on "number of remaining transfers (total number of transfers at the start)−(transfer size×transfer length)". The number of remaining transfers represents a total amount of remaining data to be transferred. Also, "transfer size×transfer length" represents an amount of data to be transferred by one burst transfer. In step S3, the transfer state signal generation circuit 21 in the CPU 11 determines whether the number of remaining transfers is larger than 0. If the number of remaining transfers is larger than 0, the CPU 11 returns to step S2 and repeats the processes of steps S2 and S3. During a period in which the state where the number of remaining transfers is larger than 0 continues, the transfer state signal generation circuit 21 maintains a state capable of asserting the transfer state signal. If the CPU 11 issues the burst transfer request in the state capable of asserting the transfer state signal, the transfer state signal is asserted in sync with the burst transfer request. The term "assertion of the transfer state signal" used herein means that the transfer state signal is set to a value indicating the presence of the succeeding transfer request. If the number of remaining transfers is 0 in step S3, the transfer state signal generation circuit 21 terminates the state capable of asserting the transfer state signal.

Figure 4:
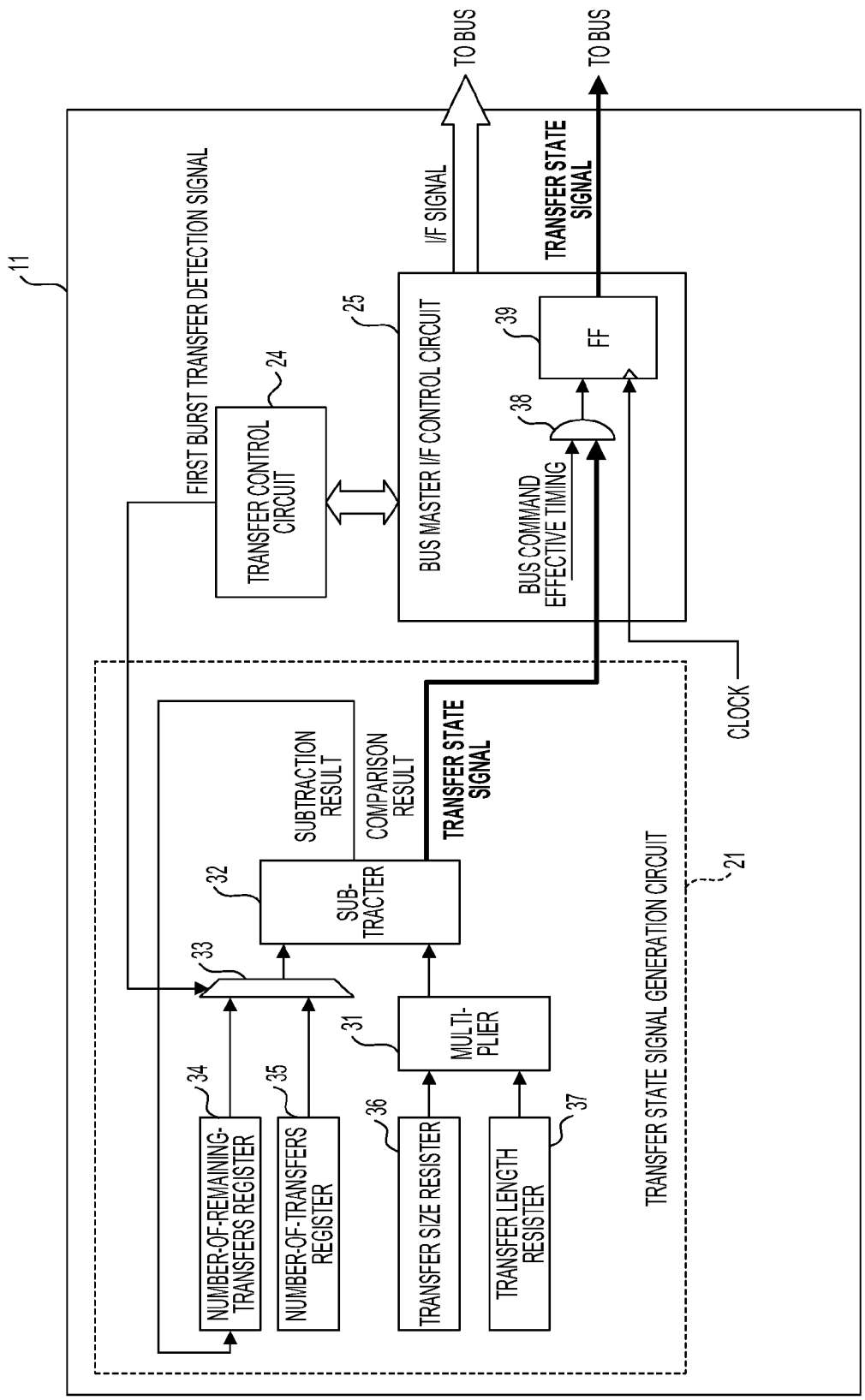
FIG. 4 is a block diagram illustrating one example of configuration of a transfer state signal generation circuit and other related circuits in the CPU.

FIG. 4 is a block diagram illustrating one example of configuration of the transfer state signal generation circuit 21 and other related circuits in the CPU 11. More specifically, FIG. 4 illustrates the transfer state signal generation circuit 21 disposed in the CPU 11 along with a transfer control circuit 24 and a bus master I/F control circuit 25 which are also disposed in the CPU 11 in association with the transfer state signal generation circuit 21. The transfer state signal generation circuit 21 includes a multiplier 31, a subtracter 32, a selector 33, a number-of-remaining-transfers register 34, a number-of-transfers register 35, a transfer size resister 36, and a transfer length resister 37. The bus master I/F control circuit 25 includes an AND circuit 38 and a flip-flop 39.

The CPU 11 sets the total number of transfers in a series of burst transfers, the transfer size, and the transfer length respectively in the number-of-transfers register 35, the transfer size resister 36, and the transfer length resister 37. The multiplier 31 calculates "transfer size×transfer length" based on respective data loaded in the transfer size resister 36 and the transfer length resister 37. A calculated value of "transfer size×transfer length" is supplied to the subtracter 32. The selector 33 receives a first burst transfer detection signal from the transfer control circuit 24. The transfer control circuit 24 serves as a circuit for controlling the series of burst transfers. When a first burst transfer in the series of burst transfers is executed, the transfer control circuit 24 sets the first burst transfer detection signal to an asserted state. When first burst transfer detection signal is in the asserted state, the selector 33 selects an output of the number-of-transfers register 35 and supplies it to the subtracter 32. In the case of the first burst transfer, the subtracter 32 calculates the number of remaining transfers based on "total number of transfers−(transfer size× transfer length)". The calculated number of remaining transfers is loaded in the number-of-remaining-transfers register 34. Further, when the calculated number of remaining transfers is larger than 0, the subtracter 32 sets the transfer state signal to a state (e.g., "HIGH") indicating the presence of at least one succeeding burst transfer.

The transfer state signal generated by the subtracter 32 is supplied to the bus master I/F control circuit 25. More specifically, the transfer state signal generated by the subtracter 32 is supplied to the flip-flop 39 through the AND circuit 38 at the bus command effective timing and is loaded in the flip-flop 39 in sync with the clock. An output of the flip-flop 39 becomes the transfer state signal that is output to the bus circuit 13.

Except for when the first burst transfer in the series of burst transfers is executed, the transfer control circuit 24 sets the first burst transfer detection signal to a negated state. When the first burst transfer detection signal is in the negated state, the selector 33 selects an output of the number-of-remaining-transfers register 34 and supplies it to the subtracter 32. The subtracter 32 calculates an updated value of the number of remaining transfers based on "number of remaining transfers−(transfer size×transfer length)". The calculated number of remaining transfers after the update is loaded in the number-of-remaining-transfers register 34. Further, when the calculated number of remaining transfers is larger than 0, the subtracter 32 sets the transfer state signal to the state (e.g., "HIGH") indicating the presence of at least one succeeding burst transfer. The operation of updating the number of remaining transfers and the operation of setting the transfer state signal in the transfer state signal generation circuit 21 are executed once per burst transfer instruction. When the number of remaining transfers becomes 0, the subtracter 32 sets the transfer state signal to a state (e.g., "LOW") indicating the absence of succeeding bust transfer.

Figure 5:
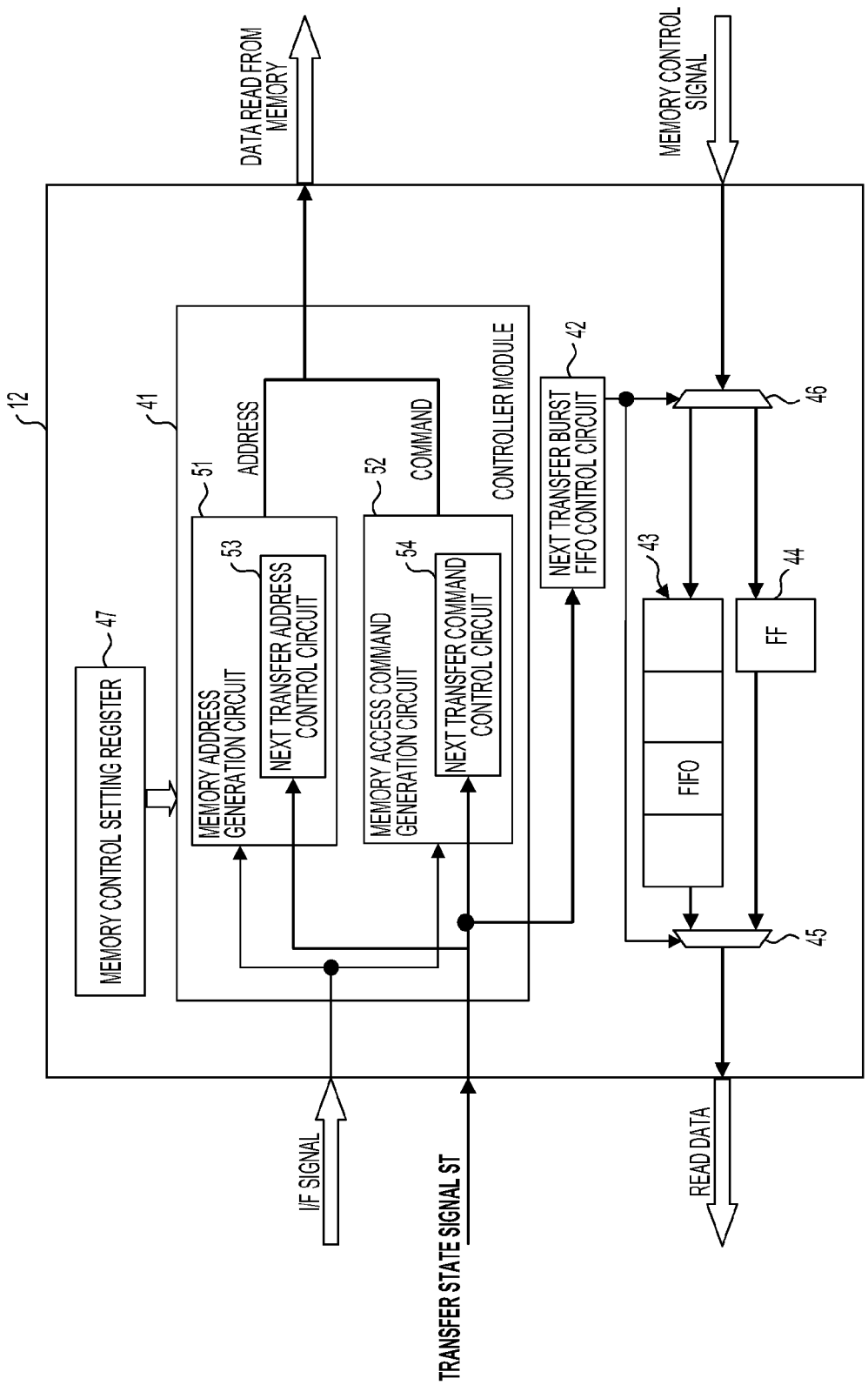
FIG. 5 is a block diagram illustrating one example of configuration of the memory controller.

FIG. 5 is a block diagram illustrating one example of configuration of the memory controller 12. The memory controller 12 includes a controller module 41, a next transfer burst FIFO control circuit 42, an FIFO 43, a flip-flop 44, selectors 45 and 46, and a memory control setting register 47. The controller module 41 includes a memory address generation circuit 51 and a memory access command generation circuit 52. The memory address generation circuit 51 includes a next transfer address control circuit 53. The memory access command generation circuit 52 includes a next transfer command control circuit 54. The FIFO 43 illustrated as a part of the memory controller 12 in FIG. 5 is illustrated as the pre-fetched data storage buffer 23 in FIG. 1 for the sake of convenience in explanation.

Whether a data pre-fetch operation is made effective or ineffective is set in the memory control setting register 47 in accordance with an instruction from a program, which is executed by the CPU 11. In the case of the memory control setting register 47 being set in a pre-fetch effective state, when one data transfer instruction is received, an operation of reading data corresponding to a succeeding data transfer instruction is executed depending on the transfer state signal ST. In the case of the memory control setting register 47 being set in a pre-fetch ineffective state, when one data transfer instruction is received, the operation of reading data corresponding to a succeeding data transfer instruction is not executed regardless of the value of the transfer state signal ST.

More specifically, when the memory control setting register 47 is set in the pre-fetch effective state, the next transfer address control circuit 53 and the next transfer command control circuit 54 are activated respectively in the memory address generation circuit 51 and the memory access command generation circuit 52. The next transfer address control circuit 53 adds the data transfer length to the address of the current data transfer request, thereby calculating a target address of data pre-fetch corresponding to a succeeding data transfer request, and supplies the calculated address to the memory 20. The next transfer command control circuit 54 issues a read command instructing that data is read in amount twice the data transfer length in response to the first data transfer request. Also, the next transfer command control circuit 54 issues a read command instructing that data is read in amount equal to the data transfer length in response to each of the second and subsequent data transfer requests. Further, the next transfer command control circuit 54 does not issue the data read command for the last data transfer instruction. Thus, the operation of the next transfer address control circuit 53 and the operation of the next transfer command control circuit 54 are controlled depending on the transfer state signal ST. When the memory control setting register 47 is set in the pre-fetch ineffective state, the next transfer address control circuit 53 and the next transfer command control circuit 54 are inactivated respectively in the memory address generation circuit 51 and the memory access command generation circuit 52. In this case, the memory address generation circuit 51 and the memory access command generation circuit 52 execute an operation of reading data corresponding to the received data transfer request regardless of the value of the transfer state signal ST.

The next transfer burst FIFO control circuit 42 controls the selectors 45 and 46 to select one of the FIFO 43 and the flip-flop 44, as required, for use in data transfer between the memory 20 and the CPU 11. When the transfer data length is 4, for example, the FIFO 43 may be a 4-stage FIFO (i.e., a FIFO capable of loading four data). Data read from the memory 20 in response to the first one in a series of burst transfer requests may be loaded in the flip-flop 44, and the data loaded in the flip-flop 44 may be immediately supplied to the CPU 11. Data read from the memory 20 in response to the burst transfer request other than the last burst transfer request may be loaded in the FIFO 43. For example, when four data D04 to D07 are read from the memory 20, those data D04 to D07 may be successively loaded in the FIFO 43. When the next burst transfer request is applied, those data D04 to D07 may be successively supplied to the CPU 11 from the FIFO 43 via the bus circuit 13, while subsequent four pre-fetch data D08 to D0b may be successively loaded in the FIFO 43. When the last one in the series of burst transfers is applied, four data loaded in the FIFO 43 may be successively read and supplied to the CPU 11 via the bus circuit 13.

Figure 6:
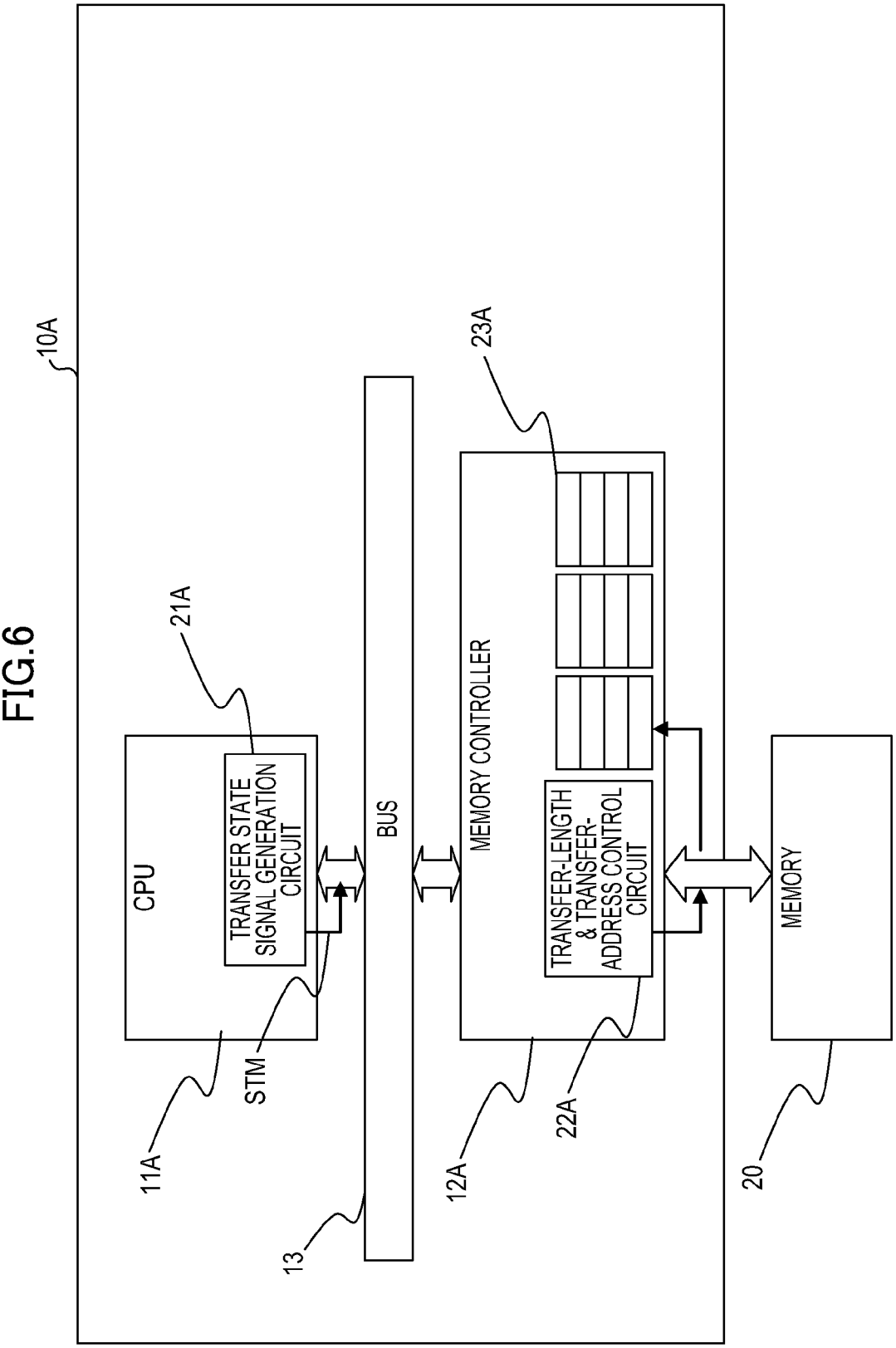
FIG. 6 is a block diagram illustrating a modification of configuration of the system including the system LSI and the memory.

FIG. 6 is a block diagram illustrating a modification of configuration of the system including the system LSI and the memory. In FIG. 6, the same components as those in FIG. 1 are denoted by the same reference numerals and descriptions of those components are omitted. Referring to FIG. 6, a system LSI 10A, serving as an information processing system, is connected to a memory 20. The system LSI 10A includes a CPU 11A that functions as a master module, a memory controller 12A for controlling access to the memory 20, and a bus circuit 13 for connecting the CPU 11A and the memory controller 12A to each other.

The CPU 11A includes a transfer state signal generation circuit 21A. When the CPU 11A successively issues a burst transfer instruction plural times, the transfer state signal generation circuit 21 outputs a transfer state signal STM in correspondence to the burst transfer instruction. The transfer state signal STM is a multi-bit signal and indicates at least how many data transfer instructions succeed some one of the data transfer instructions. For example, when three data transfer instructions succeed some one of the data transfer instructions, the transfer state signal STM may indicate a value "3". After indicating that at least number n of data transfer instructions succeed the some one of the data transfer instructions, the transfer state signal STM may be brought into a negated state (all bits being 0) for the number n of succeeding data transfer instructions. The generated transfer state signal STM is supplied to the memory controller 12A via the bus circuit 13 together with a control signal according to an I/F protocol (interface protocol) for the data transfer.

The memory controller 12A includes a transfer-length & transfer-address control circuit 22A and a multi-stage pre-fetched data storage buffer 23A. When the memory controller 12A receives one data transfer instruction and the corresponding transfer state signal STM, the memory controller 12A pre-fetches, from the memory 20, data corresponding to the data transfer instruction in number that is indicated by the transfer state signal STM, as pre-fetched data corresponding to one or more data transfer instructions which succeed the received data transfer instruction. The pre-fetched data are loaded and held in the pre-fetched data storage buffer 23A. Further, the transfer-length & transfer-address control circuit 22A is used to access data corresponding to the one or more data transfer instructions, which succeed the received data transfer instruction.

When the transfer state signal STM indicating a value "3", for example, is received, the memory controller 12A recognizes that the data transfer instruction received together with the transfer state signal STM is not the last data transfer instruction and at least three succeeding data transfer instructions are present. In that case, the memory controller 12A reads, from the memory 20, data corresponding to three data transfer instructions following the received data transfer instruction. At that time, the data corresponding to the three data transfer instructions are not necessarily required to be all continuously read from the memory 20, and those data may be read at proper respective timings. The read data are loaded and held in the pre-fetched data storage buffer 23A. After the transfer state signal STM indicating the value "3" has been output, the transfer state signal STM may be set to a value "0" in correspondence to each of two succeeding data transfer instructions. With such setting, the memory controller 12A may be avoided from executing pre-fetch of data from the same address with overlap. The transfer state signal STM in correspondence to the third data transfer instruction may be set again to a value indicating at least how many data transfer instructions succeed the third data transfer instruction. For example, when the transfer state signal STM has 2 bits, it may express 3 at maximum. Thus, when the number of burst transfer instructions in series is larger than 3, the above-described processing is repeated.

The transfer state signal STM may be a signal always indicating the number of succeeding data transfer requests in a maximum limit value that is allowable to express. For example, if, after outputting the transfer state signal STM indicating the value "3", at least three data transfer instructions further succeed each of subsequent three data transfer instructions, the transfer state signal STM may be maintained in the state indicating the value "3". Also, if the third data transfer instruction is the last data transfer instruction, the value of the transfer state signal STM may be gradually reduced in order of 2, 1 and 0 in correspondence to three succeeding data transfer instructions. In that case, however, the memory controller 12A is required to perform control such that read from the same address is not executed with overlap.

As in the case of FIG. 1, when the last data transfer instruction is received, the memory controller 12A does not execute the operation of reading data from the memory. Also, if the data corresponding to the received data transfer instruction is already read from the memory 20 and is loaded in the pre-fetched data storage buffer 23A, the loaded data is supplied to the CPU 11. When the received data transfer instruction is the first data transfer instruction, corresponding data is not yet loaded in the pre-fetched data storage buffer 23A. Therefore, the data corresponding to the first data transfer instruction may be read from the memory 20 and directly supplied to the CPU 11A.

Figure 7:
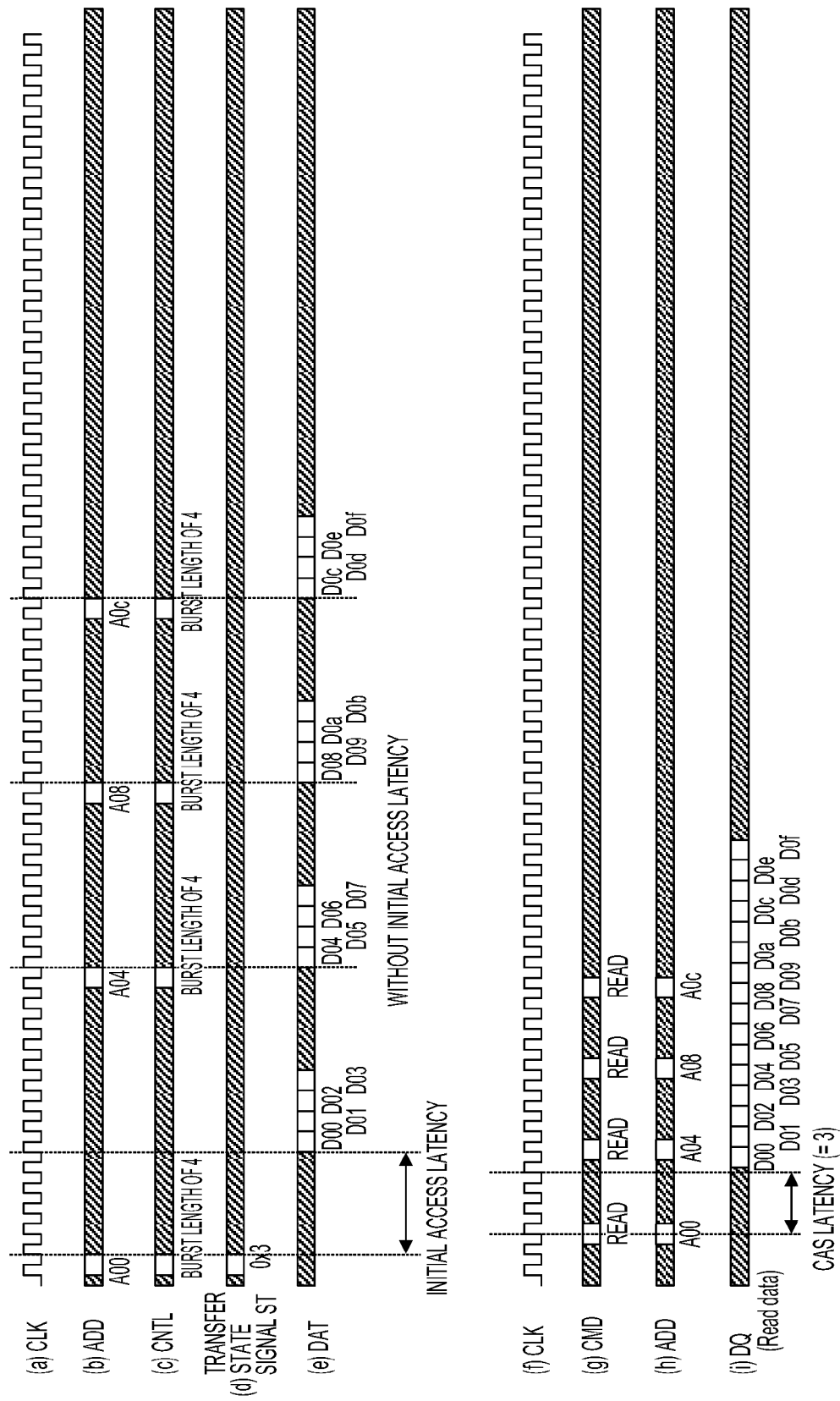
FIG. 7 illustrates one example of operations of a CPU and a memory controller.

FIG. 7 illustrates one example of operations of the CPU 11A and the memory controller 12A. First, the CPU 11A issues a burst transfer request having a transfer length of 4 with respect to an address A00. The transfer state signal STM having 2 bits and output from the CPU 11A in correspondence to the burst transfer request is set to a value "0x3" indicating that there are at least three succeeding burst transfer requests. While the transfer state signal STM is output in the same length and in the same cycle as the burst transfer request in the example of FIG. 7, the transfer state signal STM and the burst transfer request are not always required to be output at the same timing so long as the transfer state signal STM and the burst transfer request may be made correspondent to each other in one-to-one relation. By receiving the transfer state signal STM having the value "3", the memory controller 12A may previously recognize that at least three burst transfers will be executed after the burst transfer starting from the address A00, which is instructed by the current transfer request.

Because the current burst transfer request with respect the address A00 is the first burst transfer request, data corresponding to the current burst transfer request with respect to the address A00 is not yet loaded in the pre-fetched data storage buffer 23A of the memory controller 12A. Accordingly, the memory controller 12A issues a read instruction READ with designation of the address A00, thereby reading four data D00 to D03 from the memory 20 while the address A00 is set as a first start address. Also, in accordance with the transfer state signal STM having the value "3", the memory controller 12A executes further burst read three times. Stated another way, the memory controller 12A further issues another read instruction READ with designation of an address A04, thereby reading, as pre-fetched data, four data D04 to D07 from the memory 20 while the address A04 is set as a second start address. Moreover, the memory controller 12A issues still another read instruction READ with designation of an address A08, thereby reading, as pre-fetched data, four data D08 to D0b from the memory 20 while the address A08 is set as a third start address. In addition, the memory controller 12A issues still another read instruction READ with designation of an address A0c, thereby reading, as pre-fetched data, four data D0c to D0f from the memory 20 while the address A0c is set as a fourth start address.

The memory controller 12A immediately transfers the data D00 to D03, which correspond to the current burst transfer request with respect to the address A00, to the CPU 11A. On that occasion, an initial access latency of 5 cycles is generated as the sum of a CAS latency of 3 cycles generated in the memory 20 and a delay generated in the memory controller 12A. Also, the memory controller 12A loads and holds, in the pre-fetched data storage buffer 23A, the data D04 to D0f corresponding to the succeeding three burst transfer requests.

After receiving the data D00 to D03 corresponding to the burst transfer request with respect to the first start address A00 and then executing a predetermined internal process, the CPU 11A issues the next burst transfer request with respect to the subsequent second start address A04. The transfer state signal STM output from the CPU 11A in correspondence to the above next burst transfer request is set to the negated state (value "0"). The memory controller 12A immediately transfers the data D04 to D07, which correspond to the current burst transfer request with respect to the address A04, to the CPU 11A from the pre-fetched data storage buffer 23A. On that occasion, the initial access latency necessary for the CPU 11A to receive the data is not generated. Thereafter, the data D08 to D0b and the data D0c to D0f are similarly supplied to the CPU 11A from the memory controller 12A in response to the burst transfer request with respect to the third start address A08 and the burst transfer request with respect to the last start address A0c, respectively. In any case, the initial access latency necessary for the CPU 11A to receive the data is not generated.

Figure 8:
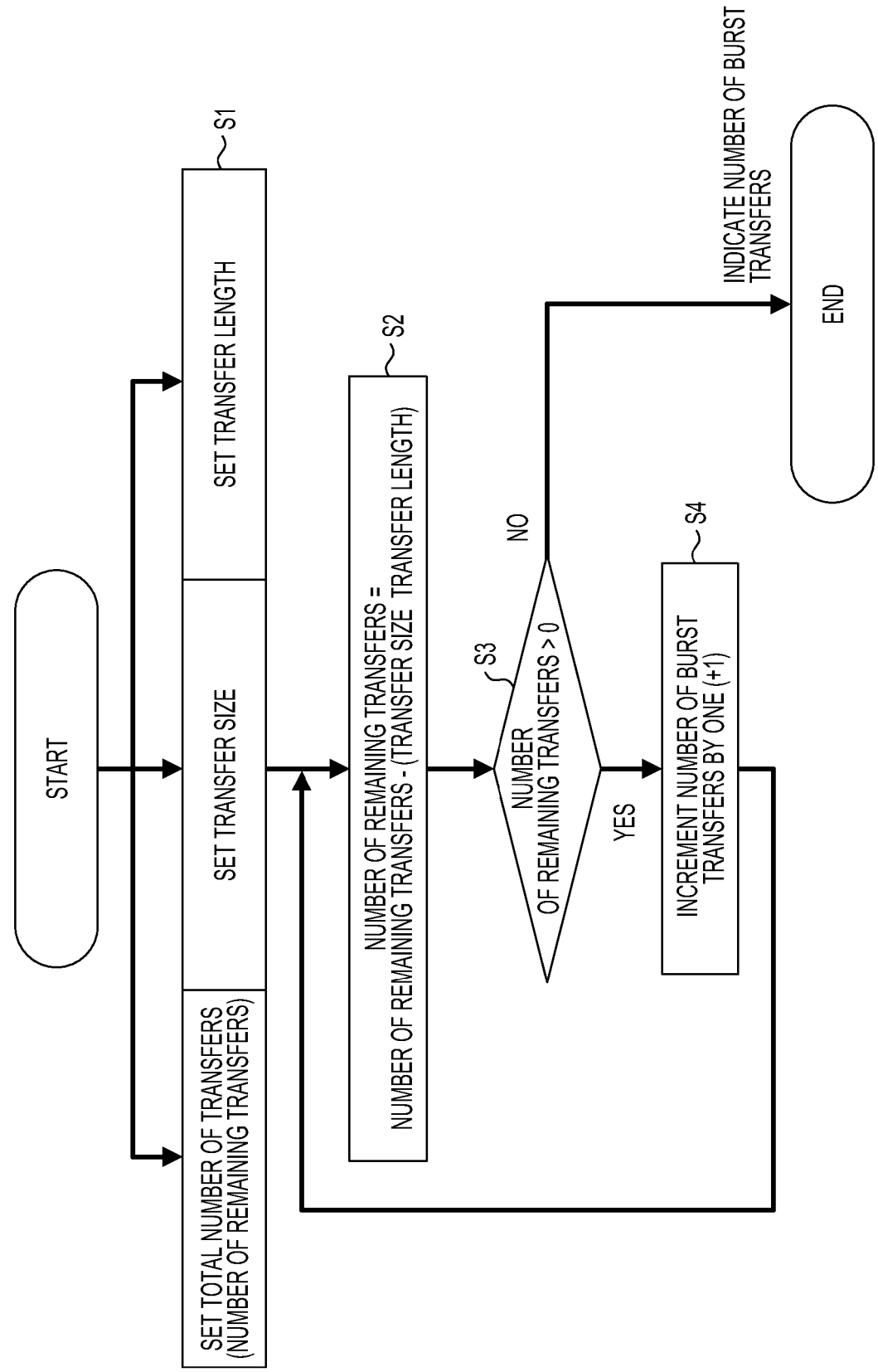
FIG. 8 is a flowchart illustrating a transfer state signal generation process executed on the CPU side.

FIG. 8 is a flowchart illustrating a transfer state signal generation process executed on the CPU 11A side. In step S1, the CPU 11A sets a total number of transfers in a series of burst transfers, a transfer size, and a transfer length. In step S2, the transfer state signal generation circuit 21A in the CPU 11A calculates the number of remaining transfers based on "number of remaining transfers (total number of transfers at the start)−(transfer size×transfer length)". In step S3, the transfer state signal generation circuit 21A in the CPU 11A determines whether the number of remaining transfers is larger than 0. If the number of remaining transfers is larger than 0, the number of burst transfers is incremented by one (+1) in step S4. Be it noted that an initial value of the number of burst transfers is set to zero (0). Thereafter, the CPU 11A returns to step S2 and repeats the processes of steps S2 and S3. If the number of remaining transfers is 0 in step S3, the transfer state signal generation circuit 21A outputs, as the transfer state signal, a signal indicating the number of burst transfers. The processing is then brought to an end.

Figure 9:
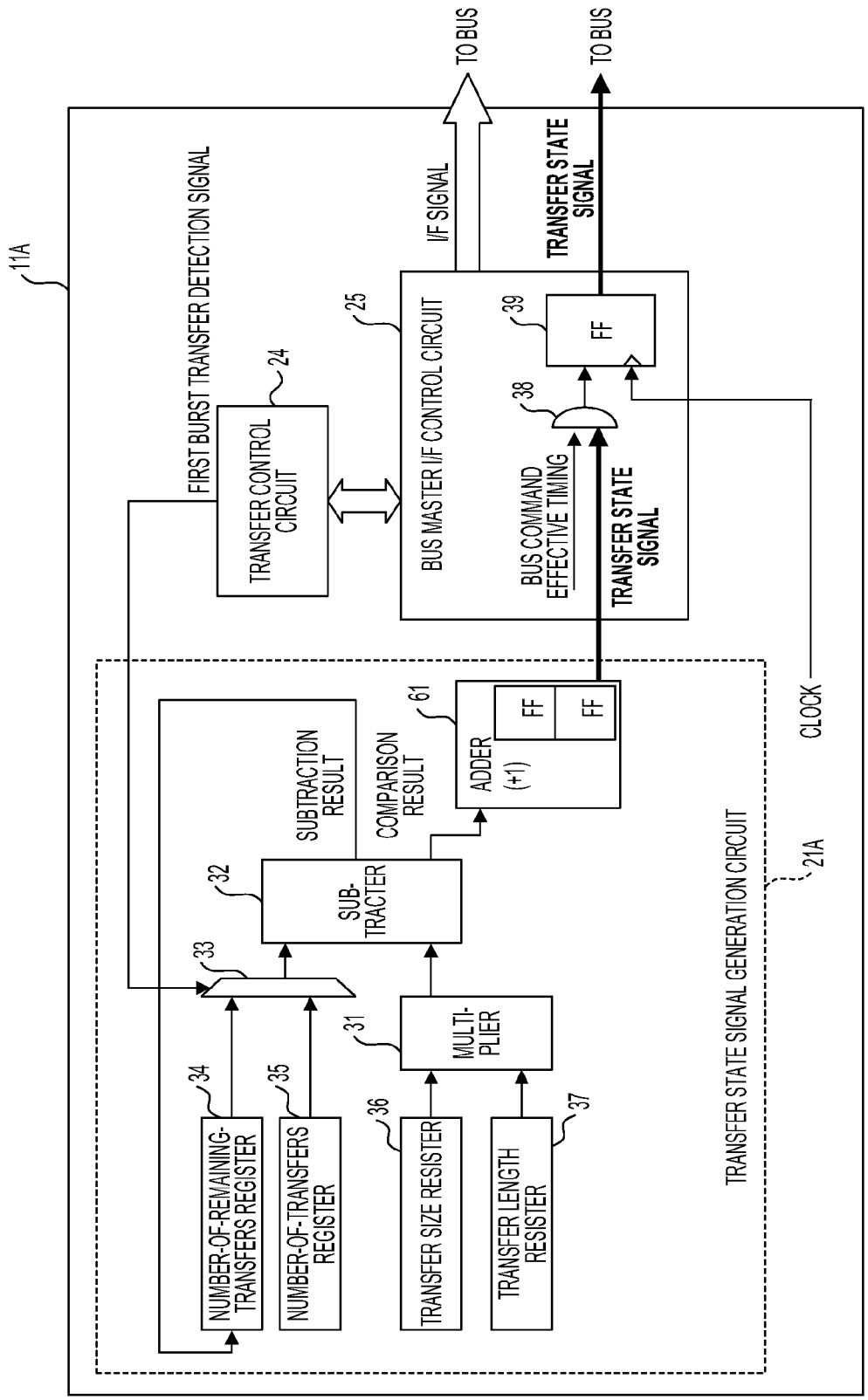
FIG. 9 is a block diagram illustrating one example of configuration of a transfer state signal generation circuit and other related circuits in the CPU.

FIG. 9 is a block diagram illustrating one example of configuration of the transfer state signal generation circuit 21A and other related circuits in the CPU 11A. In FIG. 9, the same components as those in FIG. 4 are denoted by the same reference numerals and descriptions of those components are omitted. The transfer state signal generation circuit 21A illustrated in FIG. 9 includes an adder 61 in addition to the components of the transfer state signal generation circuit 21 illustrated in FIG. 4. As in the configuration illustrated in FIG. 4, the subtracter 32 successively calculates an updated value of the number of remaining transfers based on "number of remaining transfers−(transfer size×transfer length)". Each time the number of remaining transfers is updated, a loaded value of a flip-flop FF built in the adder 61 is incremented by one (+1) if the calculated number of remaining transfers is larger than 0. This means that, when the number of remaining transfers becomes 0, the number of bursts transfers to be executed is loaded in the flip-flop FF built in the adder 61.

The transfer state signal output from the adder 61 is supplied to the bus master I/F control circuit 25. More specifically, the transfer state signal output from the adder 61 is supplied to the flip-flop 39 through the AND circuit 38 at the bus command effective timing and is loaded in the flip-flop 39 in sync with the clock. An output of the flip-flop 39 becomes the transfer state signal STM that is output to the bus circuit 13. Be it noted that FIGS. 8 and 9 illustrate the example in which the number of bits of the transfer state signal STM is set to a value capable of expressing the total number of burst transfers.

Figure 10:
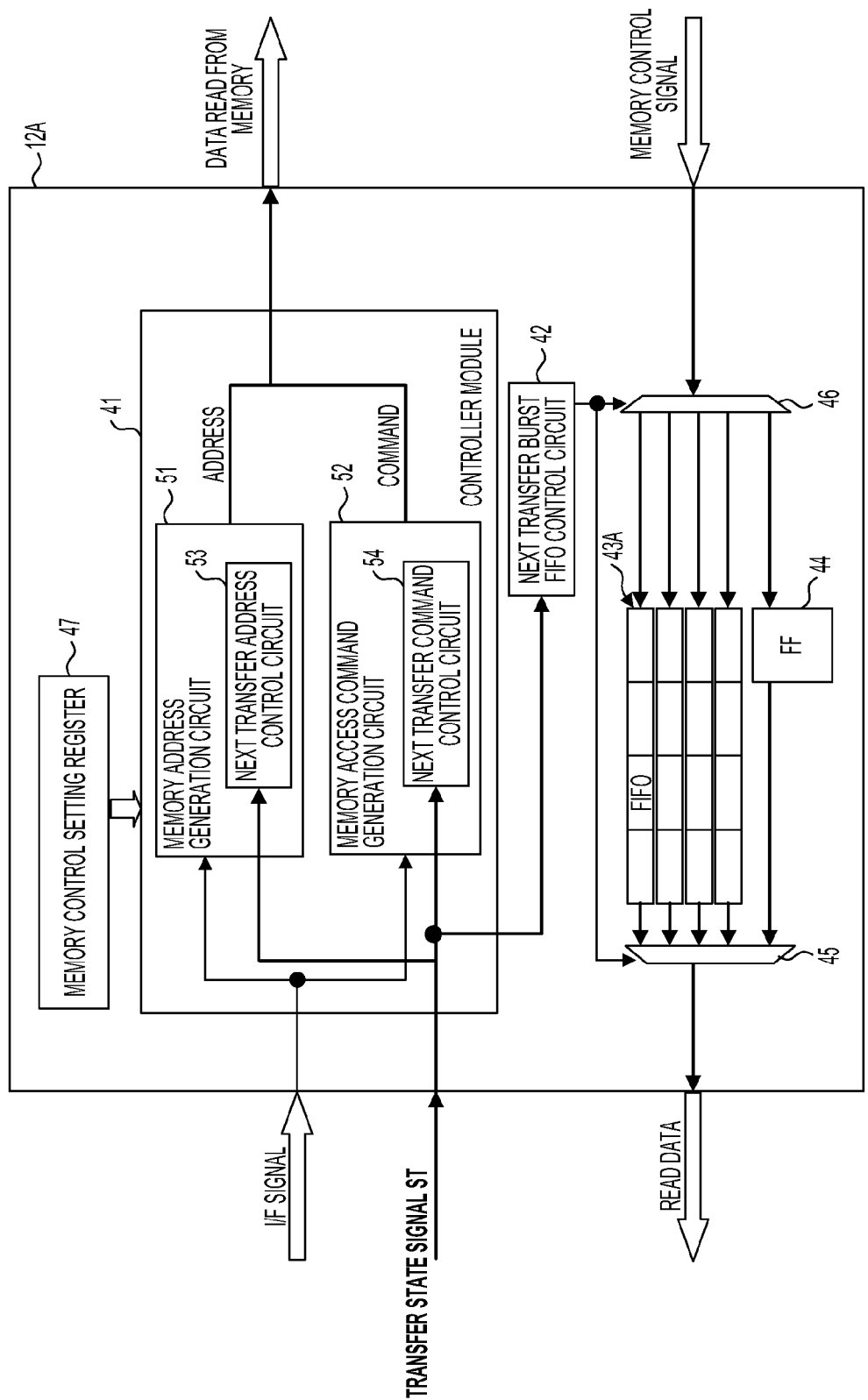
FIG. 10 is a block diagram illustrating one example of configuration of the transfer state signal generation circuit.

FIG. 10 is a block diagram illustrating one example of configuration of the transfer state signal generation circuit 21A. In FIG. 10, the same components as those in FIG. 5 are denoted by the same reference numerals and descriptions of those components are omitted. The transfer state signal generation circuit 21A illustrated in FIG. 10 differs from the transfer state signal generation circuit 21 illustrated in FIG. 5 in that the former includes a set of plural FIFOs 43A instead of the FIFO 43. The FIFO set 43A illustrated as a part of the transfer state signal generation circuit 21A in FIG. 10 is illustrated as the pre-fetched data storage buffer 23A in FIG. 1 for the sake of convenience in explanation.

The next transfer burst FIFO control circuit 42 controls the selectors 45 and 46 to select one of the FIFO set 43A and the flip-flop 44, as required, for use in data transfer between the memory 20 and the CPU 11A. The number of FIFOs included in the FIFO set 43A may be determined equal to the number of data sets to be pre-fetched. For example, when the transfer state signal STM has 2 bits and may indicate the presence of succeeding three data transfer requests at maximum, three FIFOs may be provided in the FIFO set 43A. Data read from the memory 20 in response to the first one in a series of burst transfer requests may be loaded in the flip-flop 44, and the data loaded in the flip-flop 44 may be immediately supplied to the CPU 11A. In the example of FIG. 7, the data D00 to D03 may be supplied to the CPU 11A through the flip-flop 44. Further, when the data D04 to D07, the data D08 to D0b, and the data D0c to D0f are read from the memory 20, those data sets may be successively loaded in the three FIFOs of the FIFO set 43A. When the next burst transfer request is applied, the data D04 to D07 may be successively supplied to the CPU 11A from the first FIFO of the FIFO set 43A via the bus circuit 13. Subsequently, in response to the further next burst transfer request, the data D08 to D0b may be successively supplied to the CPU 11A from the second FIFO of the FIFO set 43A via the bus circuit 13. In response to the still further next burst transfer request, the data D0c to D0f may be successively supplied to the CPU 11A from the third FIFO of the FIFO set 43A via the bus circuit 13.

Figure 11:
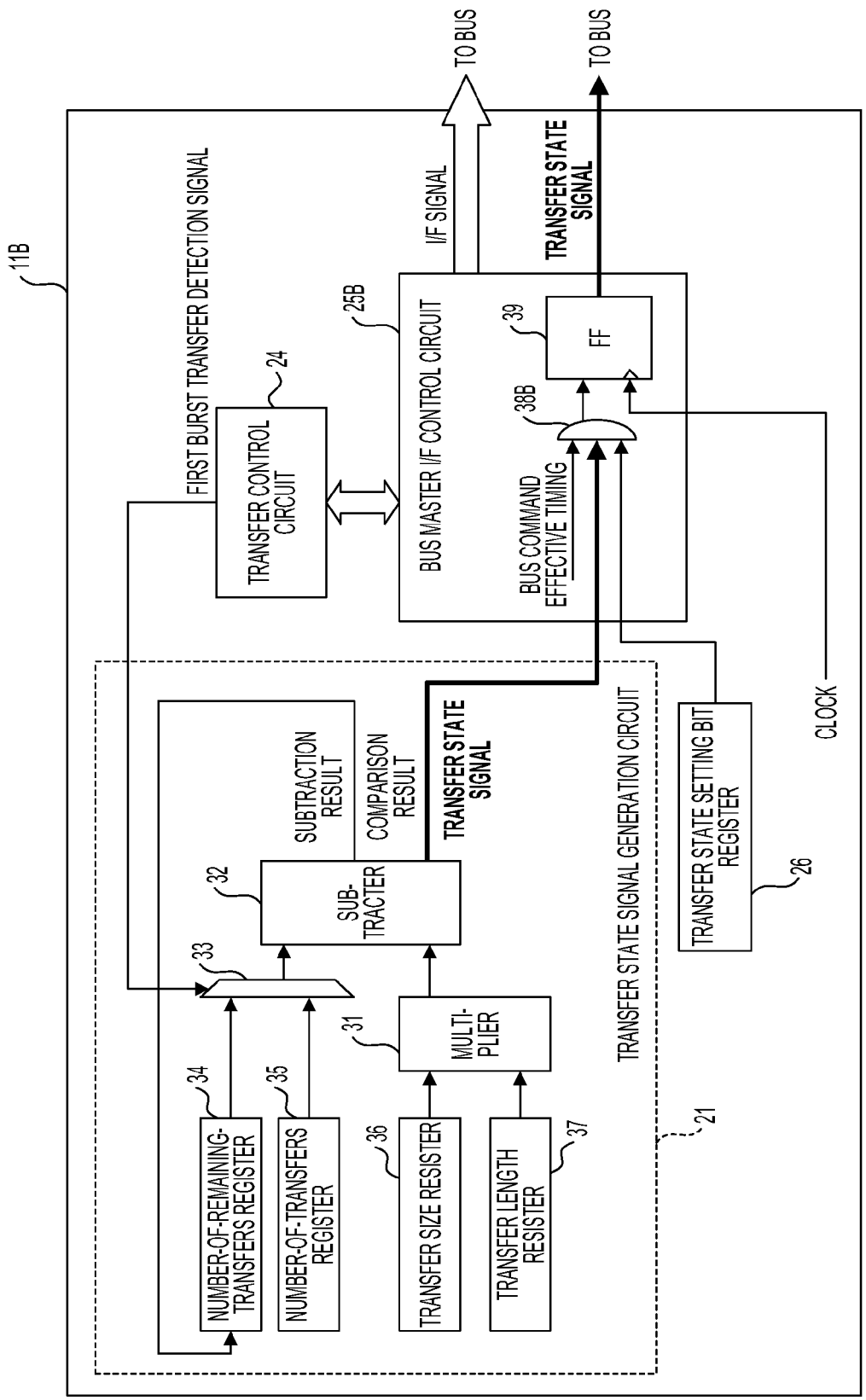
FIG. 11 is a block diagram illustrating a modification of configuration of part related to the transfer state signal generation circuit in the CPU.

FIG. 11 is a block diagram illustrating a modification of configuration of part related to the transfer state signal generation circuit 21 in the CPU. In FIG. 11, the same components as those in FIG. 4 are denoted by the same reference numerals and descriptions of those components are omitted. A CPU 11B illustrated in FIG. 11 differs from the CPU 11 illustrated in FIG. 4 in that the former includes a transfer state setting bit register 26. Corresponding to the provision of the transfer state setting bit register 26, an AND circuit 38B in a bus master I/F control circuit 25B is constituted as a 3-input AND circuit. Whether the transfer state signal is to be made effective or ineffective is set in the transfer state setting bit register 26 in accordance with an instruction from the program that is executed by the CPU 11B. When the transfer state setting bit register 26 is set to a state making the transfer state signal effective, a "HIGH" signal is supplied to the AND circuit 38B from the transfer state setting bit register 26 so as to execute the same operation as that in the configuration of FIG. 4. When the transfer state setting bit register 26 is set to a state making the transfer state signal ineffective, a "LOW" signal is supplied to the AND circuit 38B from the transfer state setting bit register 26, and an output of the AND circuit 38B is fixedly held at "LOW". In this case, the transfer state signal ST output from the CPU 11B is fixedly set in the negated ("LOW") state. Accordingly, the data pre-fetch operation described in the foregoing embodiments is not executed. When debugging the system, for example, the data pre-fetch is not preferable in some cases for the reason that transfer data requires to be analyzed in real time. In such a case, the debugging of the system may be properly executed by preventing activation of the transfer state signal under control in accordance with software.

While the embodiments have been described above in connection with the case where the memory 20 is, e.g., an SDRAM having the burst function, it is not essential that the memory 20 has the burst transfer function. For example, the memory 20 many be a DRAM operating in a page mode. As an alternative, the above-described data pre-fetch function is also useful even when the memory 20 does not have the continuous high-speed reading function, such as the burst transfer or the page mode, and data is successively read from the memory 20 to the memory controller 12. In other words, the occurrence of a latency may be avoided by pre-fetching data corresponding to the next data transfer instruction to be loaded in a buffer inside the memory controller, and supplying the pre-fetched data from the buffer to the master module when the relevant data transfer instruction is applied.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An information processing system, comprising:
a master module outputting a transfer state signal for each data read instruction when a plurality of data read instructions are successively output, each transfer state signal including a first signal state indicating that at least one more data read instruction succeeds the current data read instruction and a second signal state indicating that no more data read instructions succeed the current data read instruction; and
a memory controller configured to
when receiving a data read instruction and the transfer state signal indicating the first signal state from the master module, supply data corresponding to the current data read instruction to the master module, while reading data corresponding to the at least one more data read instruction that succeeds the current data read instruction from a memory and hold the read data corresponding to the at least one more data read instruction, and when receiving a data read instruction and the transfer state signal indicating the second signal state from the master module, supply data corresponding to the current data read instruction to the master module without newly executing an operation of reading data from the memory, wherein the memory controller calculates a read address of the at least one more data read instruction that succeeds the current data read instruction based on a transfer address, a transfer length, and a transfer size, which are requested from the master module.

2. The information processing system according to claim 1, wherein the read data corresponding to the at least one more data read instruction is held in an internal buffer of the memory controller.

3. The information processing system according to claim 1, wherein the first state signal is a signal indicating at least how many data read instructions succeed the current data transfer instruction, and when the current data read instruction and the corresponding first state signal are received from the master module, the memory controller supplies the data corresponding to the current data read instruction to the master module, while reading, as pre-fetched data corresponding to one or more data transfer instructions that succeed the current data transfer instruction, data corresponding to the data read instructions in number, which is indicated by the corresponding first state signal, from the memory and holding the read data.

4. The information processing system according to claim 3, wherein the pre-fetched data is held in an internal buffer of the memory controller.

5. The information processing system according to claim 1, wherein the memory controller includes a setting register, and wherein the memory controller executes, upon receiving one data read instruction, a data read operation corresponding to a succeeding data read instruction in accordance with the transfer state signal when the setting register is set to a first state, and does not execute, upon receiving one data read instruction, a data read operation corresponding to a succeeding data read instruction regardless of the transfer state signal when the setting register is set to a second state.

6. A data transfer method, comprising:
successively outputting a data read instruction plural times from a master module;
generating a transfer state signal for each data read instruction, each transfer state signal including a first signal state indicating that at least one more data read instruction succeeds the current data read instruction and a second signal state indicating that no more data read instructions succeed the current data read instruction;
when receiving a data read instruction and the transfer state signal indicating the first signal state from the master module, supplying data corresponding to the current data read instruction, the data being already read from a memory and loaded in a buffer, to the master module from the buffer while reading data corresponding to the at least one more data read instruction that succeeds the current data read instruction from the memory and holding the read data corresponding to the at least one more data read instruction in the buffer;
when receiving a data read instruction and the transfer state signal indicating the second signal state from the master module, supplying data corresponding to the current data read instruction to the master module without newly executing an operation of reading data from the memory; and
calculating a read address of the at least one more data read instruction that succeeds the current data read instruction based on a transfer address, a transfer length, and a transfer size, which are requested from the master module.

* * * * *